United States Patent
Russell et al.

(10) Patent No.: US 6,378,484 B1
(45) Date of Patent: Apr. 30, 2002

(54) COORDINATED CONTROL OF VALVE TIMING DURING MODE TRANSITIONS OF DIRECT INJECTION STRATIFIED CHARGE ENGINES

(75) Inventors: John D. Russell, Farmington Hills; Ilya Vladimir Kolmanovsky, Ypsilanti; Jessy W. Grizzle, Ann Arbor; Jing Sun, Bloomfield Township, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/571,063

(22) Filed: May 15, 2000

(51) Int. Cl.$^7$ .............................. F02B 17/00; F01L 1/34
(52) U.S. Cl. ..................... 123/295; 123/305; 123/90.15
(58) Field of Search ................................. 123/295, 305, 123/90.15–90.18

(56) References Cited

U.S. PATENT DOCUMENTS

| | | | |
|---|---|---|---|
| 5,690,071 A | * 11/1997 | Jankovic | ..................... 123/295 |
| 5,785,031 A | 7/1998 | Akimoto | |
| 5,970,950 A | 10/1999 | Shimizu | |
| 6,006,725 A | 12/1999 | Stefanopoulou | |
| 6,039,026 A | * 3/2000 | Shiraishi et al. | ............. 123/399 |
| 6,101,993 A | * 8/2000 | Lewis et al. | ............. 123/90.17 |
| 6,148,791 A | * 11/2000 | Fujieda et al. | ............. 123/295 |
| 6,182,636 B1 | * 2/2001 | Russell et al. | ............. 123/399 |
| 6,250,283 B1 | * 6/2001 | Russell et al. | ........... 123/90.15 |

* cited by examiner

Primary Examiner—Erick Solis
(74) Attorney, Agent, or Firm—Allan J. Lippa (57) ABSTRACT

A system and method for controlling a direct injection stratified charge engine during transitions between homogeneous and stratified operating modes position the throttle to a position corresponding to the desired operating mode to begin the transition and use valve timing control to provide a rapid change in air flow to traverse the gap between acceptable air/fuel ratios associated with the homogeneous and stratified modes. The invention reduces torque variations while improving engine performance by coordinating control of an electronic throttle and valve timing to reduce or eliminate step changes in fuel previously required to traverse the air/fuel ratio gap between modes. Primary reliance on air flow and fuel flow to reduce torque variations and improve driveability reduces reliance on spark timing and associated performance penalties.

20 Claims, 5 Drawing Sheets

COORDINATED CONTROL OF VALVE TIMING DURING MODE TRANSITIONS OF DIRECT INJECTION STRATIFIED CHARGE ENGINES

TECHNICAL FIELD

The present invention relates to systems and methods for engine control during mode transitions of direct injection stratified charge (DISC) engines.

BACKGROUND ART

Operating modes for direct injection stratified charge (DISC) engines may include a homogeneous mode in which the combustion chambers contain a substantially homogeneous mixture of air and fuel, and a stratified mode in which the combustion chambers contain stratified layers of different air/fuel mixtures. Stratified mode generally includes strata containing a stoichiometric air/fuel mixture nearer the spark plug with lower strata containing progressively leaner air/fuel mixtures.

Typically, there is a first range of air/fuel ratios within which stable combustion can be achieved in the stratified mode, such as between 25:1 and 40:1, and a second range in which stable combustion can be achieved in the homogeneous mode, such as between 12:1 and 20:1. As such, there is typically a significant gap between the leanest air/fuel ratio of the homogeneous mode (20 in this example), and the richest air/fuel ratio of the stratified mode (25 in this example). This gap poses a number of challenges in selecting an appropriate operating mode and controlling the engine during transitions between operating modes. For example, careful control of engine operation is necessary to deliver the demanded torque without adversely affecting driveability when switching from the stratified to the homogeneous mode or vice versa.

Methods for using an electronic throttle in combination with fuel injection and spark timing to achieve fast and smooth mode transition in DISC engines without valve timing control are known. However, use of conventional strategies on DISC engines with valve timing control, such as variable cam timing (VCT)applications, may result in reduced fuel economy and deteriorated driveability.

For example, deteriorations in driveability are often associated with changing operating modes between the homogeneous and stratified modes due to the gap between acceptable air/fuel ratios for the two modes of operation in a DISC engine. Because the air charge can not be changed instantaneously, a step change in the fueling rate is necessary at the time instant of the mode switch to satisfy the air/fuel ratio constraints. However, friction torque and the pumping losses do not change instantaneously at the switch point. Consequently, a jump in the fueling rate may lead to a jump in the engine torque with resulting objectionable driveability.

To mitigate the effect of any torque disturbance during mode transitions, some conventional strategies reduce or retard spark timing. However, retarding the spark timing from its optimal setting will typically cause fuel economy penalties and increase feedgas emissions. Furthermore, depending on the engine operating conditions, the spark timing authority may not be sufficient to reduce the torque disturbance to an acceptable level. Thus, mode switching strategies for DISC engines having valve timing control that improve driveability and enhance engine performance are needed.

SUMMARY OF THE INVENTION

One object of the present invention is to provide a system and method of coordinated control of fueling rate, spark timing, electronic throttle, and valve timing in DISC engines during mode transitions to improve engine performance.

In carrying out the above object and other objects, advantages, and features of the present invention, a system and method for controlling a direct injection stratified charge engine having an electronically controlled throttle and controllable valve timing during transitions between a current operating mode and a desired operating mode to reduce variations in engine torque from a desired engine torque include moving the throttle to a position associated with the desired operating mode, adjusting fuel flow to substantially maintain the desired engine torque as air/fuel ratio approaches an air/fuel ratio gap between acceptable air/fuel ratios for the current operating mode and acceptable air/fuel ratios for the desired operating mode, and changing valve timing to valve timing associated with the desired operating mode to modify cylinder air charge while changing fuel injection timing associated with the current operating mode to fuel injection timing associated with the desired operating mode as the air/fuel ratio traverses the gap.

The present invention provides a number of advantages. For example, by using valve timing in coordination with an electronic throttle to modulate the intake air to traverse the acceptable air/fuel ratios gap, the discontinuous fuel step and spark retard which are otherwise necessary for torque management can be substantially reduced or eliminated. The present invention can be used for various valve timing control strategies including intake only, dual equal, or dual independent variable cam timing applications, among others. Furthermore, the combination of valve timing control with the stratified charge engine technology allows additional freedom in improving emission constrained fuel economy.

The above advantages and other advantages, objects, and features of the present invention, will be readily apparent from the following detailed description of the best mode for carrying out the invention when taken in connection with the accompanying drawings.

BEST MODE FOR CARRYING OUT THE INVENTION

Figure 1:
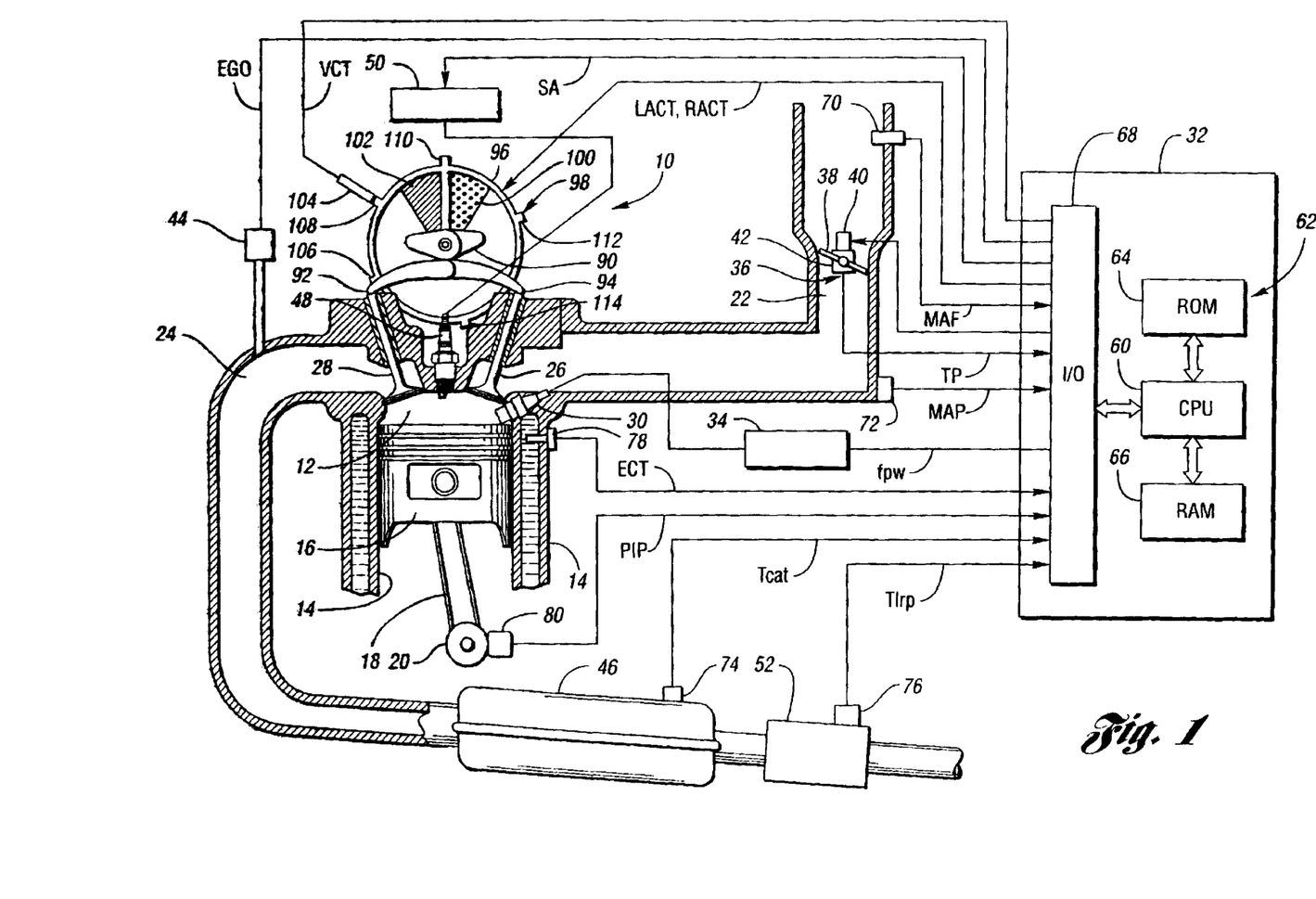
FIG. 1 is a block diagram illustrating operation of a system and method for coordinated control of valve timing during mode transitions of a DISC engine according to the present invention.

A block diagram illustrating operation of one embodiment of a system or method for engine control of a DISC engine according to the present invention is shown in FIG. 1. This embodiment includes an engine 10 having a particular variable cam timing mechanism to provide valve timing control. However, the present invention is equally applicable to other types of variable cam timing (VCT) engines in addition to camless engines and variable valve timing engines as will be recognized by those of skill in the art.

The direct injection internal combustion engine 10 includes a plurality of combustion chambers or cylinders 12 having combustion chamber walls 14 with piston 16 positioned therein. Each piston 16 is coupled via a connecting rod 18 to crankshaft 20. Combustion chamber, or cylinder, 12 is shown communicating with intake manifold 22 and exhaust manifold 24 via respective intake valves 26 and exhaust valves 28. Fuel injector 30 is shown directly coupled to combustion chamber 12 for directly injecting fuel into cylinder 12 in one or more injections or events based on the pulse width of signal fpw generated by electronic engine controller 32 and conditioned or processed by conventional electronic driver 34.

Intake manifold 22 includes a throttle body assembly 36 having a throttle plate or valve 38 which may be used to modulate air flow through intake manifold 22. In this particular example, throttle plate 38 is coupled to electric motor 40 which receives control signals from controller 32 to position throttle plate 38 within intake manifold 22. The position of throttle plate 38 is monitored by an appropriate throttle position sensor 42 which provides a throttle position (TP) signal to controller 32. Closed-loop feedback control of the position of throttle plate 38 is performed by controller 32 to control airflow through intake manifold 22 and into cylinders 12. This configuration is commonly referred to as an electronic throttle control (ETC) or drive-by-wire system because there is no mechanical linkage between the driver's foot pedal and the throttle valve.

Exhaust gas oxygen sensor 44 is shown coupled to exhaust manifold 24 upstream of catalytic converter 46. In this particular example, sensor 44 provides a corresponding signal (EGO) to controller 32 which is then converted into an associated two-state signal (EGOS) used in closed loop lambda control. A high voltage state of signal EGOS indicates exhaust gases are rich of stoichiometry and a low voltage state of signal EGOS indicates exhaust gases are lean of stoichiometry. Various other types of exhaust gas sensors may also be used and have various advantages and trade-offs as well known by those of skill in the art.

Controller 32 controls operation of engine 10 and selects an appropriate operating mode for current operating conditions and driver demand. Controller may operate engine 10 in either a homogeneous air/fuel mode or a stratified air/fuel mode by appropriately controlling injection timing. In the stratified mode, controller 32 activates fuel injector 30 during the engine compression stroke so that fuel is sprayed directly into the bowl of piston 16. This creates layers or strata of differing air/fuel ratios within cylinder 12. The strata closest to spark plug 48 contain a stoichiometric mixture or a mixture slightly rich of stoichiometry, while subsequent strata contain progressively leaner mixtures.

During the homogeneous mode, controller 32 activates fuel injector 30 during the intake stroke so that a substantially homogeneous air/fuel mixture is formed when ignition power is supplied to spark plug 48 by ignition system 50 based on a spark advance or ignition timing signal (SA) generated by controller 32. Controller 32 also controls the amount of fuel delivered by fuel injector 30 so that the homogeneous air/fuel mixture in chamber 12 can be selected with a stochiometric ratio, a value rich of stoichiometry, or a value lean of stoichiometry. Operation during the stratified mode always results in an average air/fuel ratio lean of stoichiometry. An additional split-injection mode of operation wherein additional fuel is injected during the intake or exhaust stroke while operating in the stratified mode is also possible.

To further reduce tailpipe emissions, a nitrogen oxide ($NO_x$) absorbent or trap 52 may be used and is typically positioned downstream of catalytic converter 46. $NO_x$ trap 52 absorbs the $NO_x$ produced when engine 10 is operating lean of stoichiometry, and is therefore often referred to as a lean $NO_x$ trap (LNT). The LNT must be periodically purged or regenerated to maintain its effectiveness. During a purge cycle, engine 10 is operated in a rich or stoichiometric homogeneous mode such to increase reductants (such as HC and CO) in the feedgas passing through LNT 52. The excess HC and CO reacts with the stored $NO_x$ to purge or regenerate LNT 52. The present invention may improve purge cycle efficiency by reducing the time necessary for transition between stratified mode and homogeneous mode during an LNT purge as explained in greater detail below.

Engine controller 32 is shown in FIG. 1 as a conventional microcomputer including a microprocessor unit 60 in communication with various computer readable storage media, indicated generally by reference numeral 62, via a data and address bus. Computer readable storage media 62 preferably include physical memory devices such as read-only memory (ROM) 64, random-access memory 66, and the like capable of storing data representing executable instructions and calibration information used by microprocessor 60 to control engine 10. Computer readable storage media 62 may include various other types of temporary or persistent memory or storage such as EPROM, EEPROM, flash, or any other type of magnetic, optical, or combination devices capable of data storage. Controller 32 also includes various input/output ports 68 which may provide signal conditioning, detection, scaling, short circuit protection, and the like to communication with various sensors and actuators in controlling engine 10.

In operation, controller 32 receives signals from various sensors preferably including a mass air flow sensor (MAF) 70, a manifold pressure sensor (MAP) 72, a catalyst temperature sensor ($T_{cat}$) 74, an LNT temperature sensor ($T_{trp}$) 76, an engine coolant temperature sensor (ECT) 78, a and a crankshaft position sensor 80, for example. An engine speed signal (RPM) is generated by controller 32 from an ignition profile signal (PIP) generated by crankshaft position sensor 80 in response to rotation of crankshaft 20.

Continuing with FIG. 1, camshaft 90 of engine 10 is shown communicating with rocker arms 92 and 94 for actuating intake valves 26 and exhaust valves 28 to control the air charge entering cylinder 12 and the exhaust gases exiting cylinder 12. Camshaft 90 is directly coupled to housing 96. Housing 96 forms a toothed wheel having a plurality of teeth 98. Housing 96 is hydraulically coupled to an inner shaft (not shown), which is in turn directly linked to camshaft 90 via a timing chain (not shown). As such, housing 96 and camshaft 90 rotate at a speed substantially equivalent to the inner camshaft. The inner camshaft rotates at a constant speed ratio relative to crankshaft 20.

Variable cam timing is provided by manipulation of the hydraulic coupling to change the relative position of camshaft 90 to crankshaft 20. The hydraulic coupling is manipulated by varying hydraulic pressures in advance chamber 100 and retard chamber 102. Controller 32 sends control signals (LACT,RACT) to conventional solenoid valves (not shown) to control the flow of hydraulic fluid either into advance chamber 100, retard chamber 102, or neither. By allowing high pressure hydraulic fluid to enter advance chamber 100, the relative relationship between camshaft 90 and crankshaft 20 is advanced. Thus, intake valves 26 and exhaust valves 28 open and close at a time earlier than normal relative to crankshaft 20. Similarly, by allowing high pressure hydraulic fluid to enter retard chamber 102, the relative relationship between camshaft 90 and crankshaft 20 is retarded. Thus, intake valves 26 and exhaust valves 28 open and close at a time later than normal relative to crankshaft 20.

Teeth 98, being coupled to housing 96 and camshaft 90, allow for measurement of relative cam position via cam timing sensor 104 by providing a signal (VCT) to controller 32. Teeth 98 preferably include equally spaced teeth 106, 108, 110, and 112 which can be used for measurement of cam timing, in addition to a tooth 114 preferably used for cylinder identification.

Figure 2:
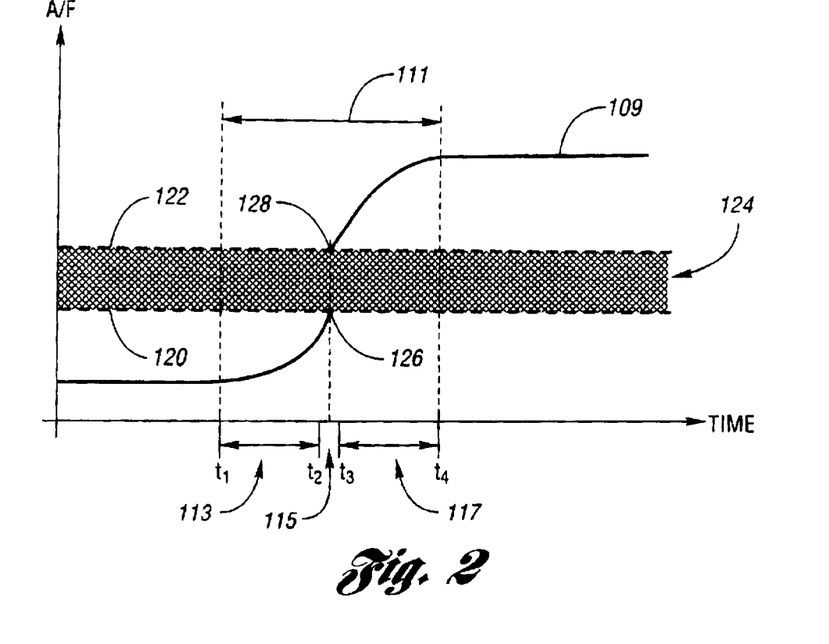
FIG. 2 is a graph illustrating air/fuel ratio constraints during a transition from homogeneous mode to stratified mode according to the present invention.

FIG. 2 is a graph illustrating air/fuel ratio constraints during a transition from homogeneous mode to stratified mode according to the present invention. The air/fuel ratio, represented by line 109, varies from its initial value within the homogeneous range of air/fuel ratios to a final value within the stratified range of air/fuel ratios during the period of transition, represented by line 111. In general, the transition may be divided into a pre-positioning phase 113 between times $t_1$ and $t_2$, a switching phase 115 between times $t_2$ and $t_3$, and a settling phase 117 between times $t_3$ and $t_4$. As described above, the homogeneous range of acceptable air/fuel ratios includes an upper bound 120 which is separated from the lower bound 122 of the acceptable air/fuel ratios for the stratified mode. This creates a gap 124 between acceptable air/fuel ratios as described above.

A representative transition begins at time $t_1$ with an increase of the air charge which raises the air/fuel ratio until it reaches the boundary point 126. To avoid unstable combustion, it is desirable to substantially instantaneously traverse gap 124 and "jump" to operating point 128 during switching phase 115. Without the present invention, to satisfy the discontinuity created by gap 124 in the air/fuel ratios, it was necessary to command a step increase in fuel flow. The corresponding change in torque induced by the change in fuel flow was then managed using ignition timing or spark. Coordinated control of airflow by controlling valve timing and an electronic throttle according to the present invention allows the discontinuity between points 126 and 128 to be satisfied without substantially altering the spark or ignition timing.

Figure 3:
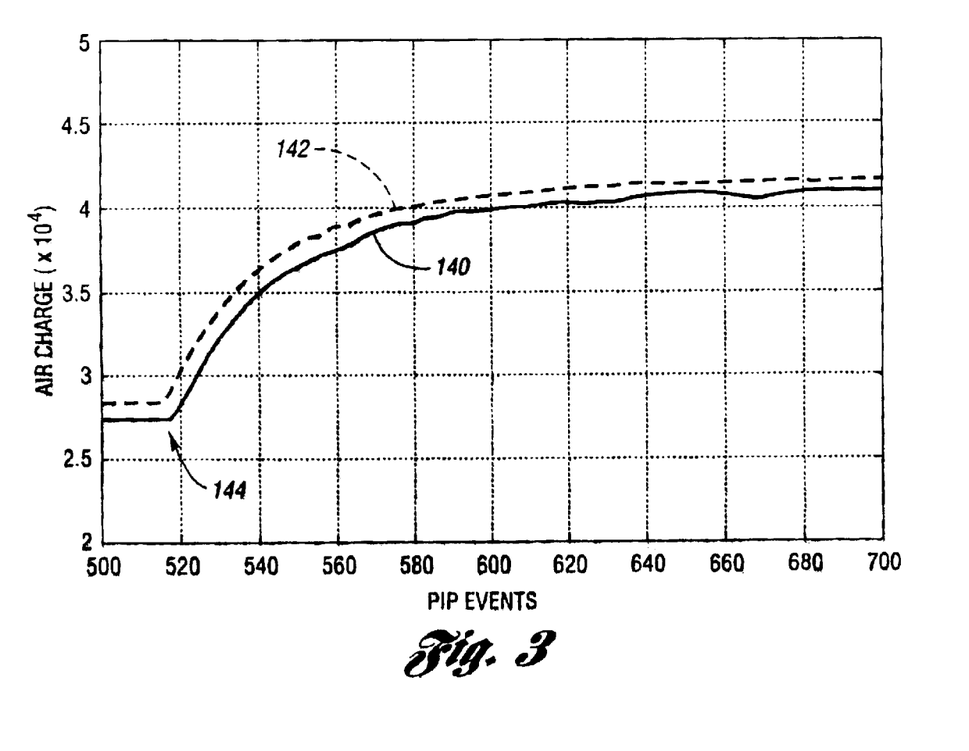
FIG. 3 is a graph illustrating cylinder air charge response to a step change in throttle valve position.

With continuing reference to FIG. 2, during the pre-positioning phase 113, beginning at time $t_1$, the electronic throttle is moved to a position associated with the desired operating mode, i.e. stratified mode in this example. As illustrated in FIG. 3, the response of cylinder air charge to a step change in throttle position occurring at 144 is by lines 140 and 142. Line 140 represents the air charge response as estimated from the mass airflow sensor (MAF) while line 142 represents the air charge response as estimated from the manifold absolute pressure (MAP) sensor. Thus, during pre-positioning period 113 of FIG. 2, the step change of throttle position results in a slowly increasing air/fuel ratio as the intake airflow increases. During this period, the present invention adjusts the fuel flow to substantially maintain the desired engine torque as the air/fuel ratio approaches gap 124. In an alternative embodiment, valve timing may also be altered during pre-positioning period 113 by adjusting a variable cam timing device (or variable valve timing actuators) such that valve timing is set to an intermediate timing to decrease the overall transition time from time $t_1$ to time $t_4$.

As the air/fuel ratio approaches point 126 of FIG. 2, the present invention changes the valve timing to a valve timing associated with the desired operating mode (stratified mode in this example) to modify the cylinder air charge while changing the fuel injection timing associated with the current operating mode (homogeneous in this example) to fuel injection timing associated with the desired operating mode (stratified) as the air/fuel ratio traverses gap 124. As such, in this example, fuel injection timing is changed from early to late and preferably aligned with a step change in valve timing to quickly traverse gap 124. Valve timing is changed to provide a nearly instantaneous change or jump in the air charge into the cylinder between points 126 and 128.

Figure 4:
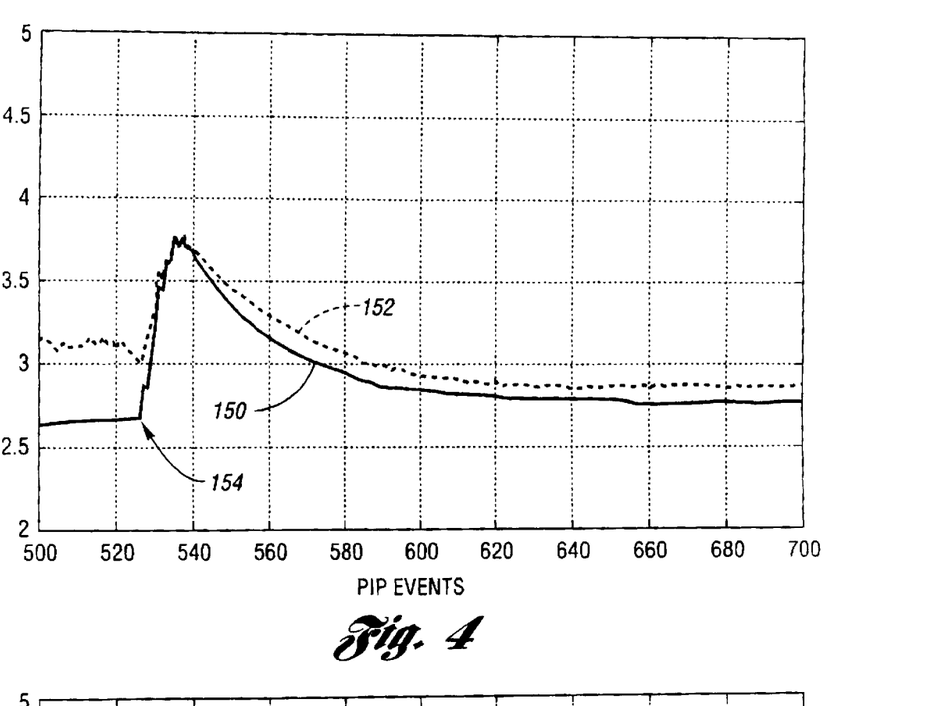
FIG. 4 is a graph illustrating cylinder air charge response to a step change in valve timing for a variable cam timing application.

As illustrated in FIG. 4, cylinder air charge responds more quickly to a change of valve timing than to a change of throttle position (as shown in FIG. 3). Air charge as estimated or inferred using the MAF sensor signal is represented by line 150 of FIG. 4 while air charge as estimated or inferred using the MAP sensor is represented by line 154 in FIG. 4. When valve timing is changed from the timing associated with homogeneous mode to the timing associated with stratified mode at point 154, the cylinder air charge responds much more quickly than the air charge response associated with a change solely in throttle position (compare FIG. 3). Preferably, the change of air charge associated with valve timing is aligned with switching phase 115 (illustrated in FIG. 2) so that the air/fuel ratio quickly traverses gap 124. The actual timing of the command signal that effects the change in valve timing preferably accounts for any electrical and/or mechanical delay such that the actual change in air flow is appropriately aligned and may vary by application. The valve timing, throttle position, and fuel flow is then controlled during settling phase 117 to reach a steady state operating point to conclude the transition phase 111 and enter steady-state operation.

Figure 5:
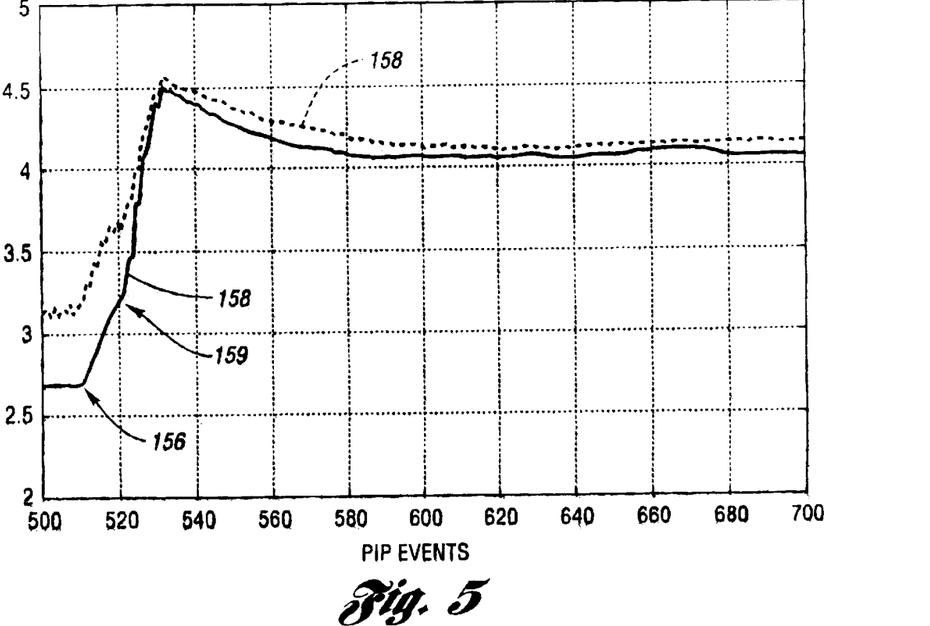
FIG. 5 is a graph illustrating cylinder air charge response for coordinated control of throttle valve position and valve timing in a variable cam timing application according to the present invention.

FIG. 5 is a graph illustrating cylinder air charge response for coordinated control of throttle valve position and valve timing in a variable cam timing application according to the present invention. A step change in throttle position is initiated at 156. The cylinder air charge begins to increase in response as represented by lines 157, which is estimated or inferred using the MAF sensor signal, and line 158, which is measured or inferred using the MAP sensor signal. Valve timing is then adjusted as indicated generally around 159 which increases the rate of increase of the cylinder air charge as best illustrated by line 157. Both lines 157 and 158 demonstrate the second order response of the system with overshoot which may vary depending upon the particular control parameters as known by those skilled in the art. The control parameters may be appropriately adjusted to provide a quick response in the cylinder air charge to reduce transition time between operating modes according to the present invention while minimizing overshoot and oscillation.

Figure 6:
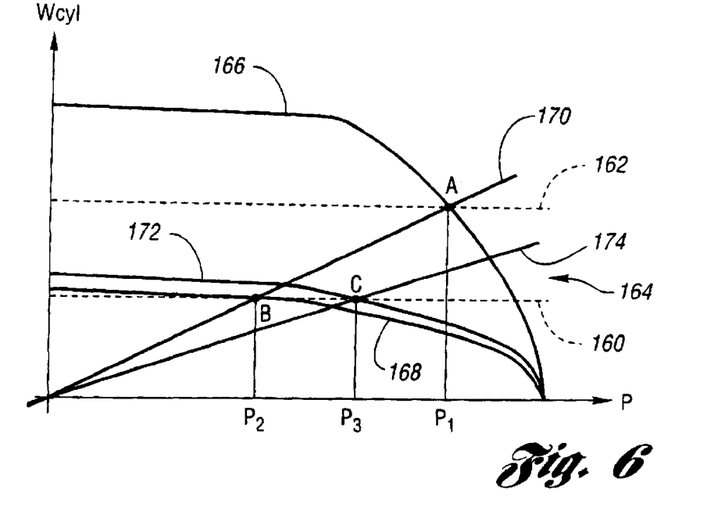
FIG. 6 is a graph illustrating a modified steady state operating point for homogeneous mode and transition to a stratified mode with variable valve timing according to the present invention.

FIG. 6 provides a diagram illustrating steady state operating points for a stratified mode and homogeneous mode to illustrate operating mode transitions according to the present invention. The diagram of FIG. 6 plots cylinder air charge ($W_{cyl}$) as a function of intake manifold pressure (P) for constant throttle positions and constant cam positions. Line 160 represents the steady state cylinder air charge for homogeneous mode while line 162 represents the steady state cylinder air charge for stratified mode. Line 166 corresponds to the air charge for a constant throttle position $\theta_1$, line 168 represents a constant throttle position $\theta_2$, and line 172 represents a constant throttle position $\theta_3$. Line 170 represents a first constant valve timing or positioning while line 174 represents a second constant valve timing or positioning.

Point B of FIG. 6 represents the steady state operating point for applications having fixed valve timing and has an associated intake manifold pressure $p_2$. During a transition from homogeneous mode to stratified mode, the operating point moves from point B to point A by opening the throttle from position $\theta_2$ to $\theta_1$ traversing constant valve timing (cam position for VCT applications) line 170. The intake manifold pressure will then be increased from $p_2$ to $p_1$. As described above with reference to FIG. 2, without using the teachings of the present invention, the continuous change in cylinder air charge would require a step change in the fueling rate in order to traverse the air/fuel ratio gap with torque management accomplished by retarding spark from an optimal setting. According to the present invention, valve timing control can be used to move the steady state operating point for homogeneous mode from point B to point C for the same cylinder air charge requirement as represented by line 160. Because point C corresponds to higher manifold intake pressure $p_3$ relative to point B, the pumping loss is reduced and may result in fuel economy gains. In addition, because the change in throttle position from $\theta_3$ (point C) to $\theta_1$ (point A) is less than the change in throttle position from $\theta_2$ to $\theta_1$, the transition time is reduced. The reduction in transition period may lead to improved purging efficiency for the LNT. As described above, an LNT purge cycle may require transitioning from the stratified mode to a stoichiometric or slightly rich homogeneous mode which generally results in lower fuel economy. In addition, coordination of valve timing, electronic throttle positioning, fuel flow and timing, and spark timing provides additional control during the mode transitions. These parameters can be adjusted to provide many different paths between steady state operating points C and A such that the trajectory which minimizes the transition time without incurring a penalty for fuel economy, emissions, and/or driveability may be followed.

Figure 7A:
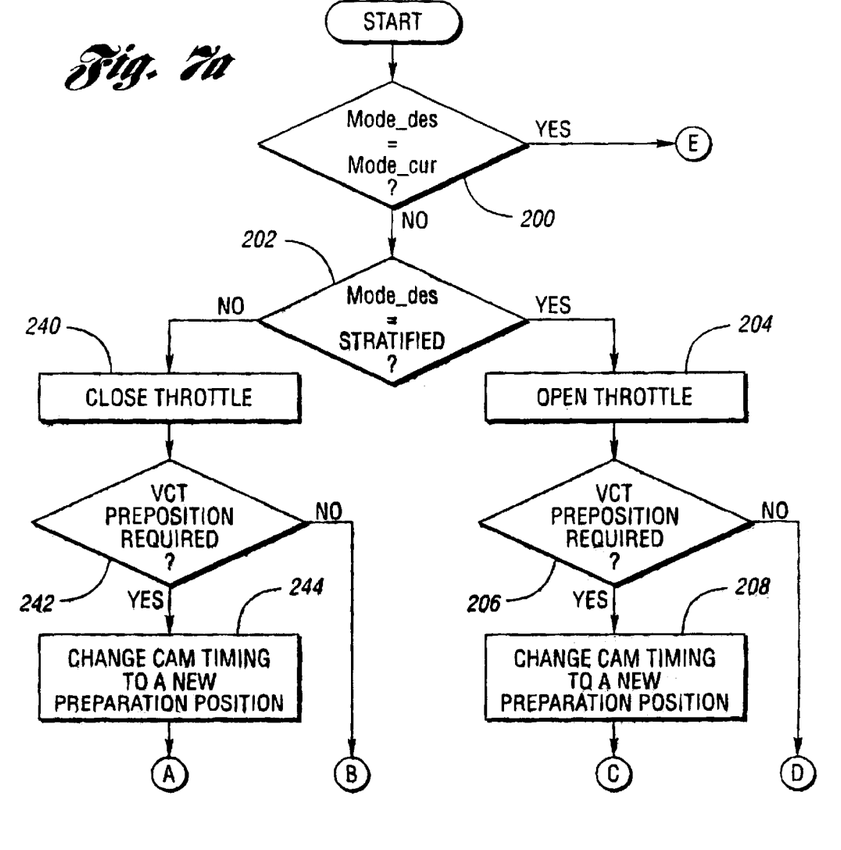
FIGS. 7a and 7b are a flow chart illustrating operation of a system or method for mode transition for a variable cam timing embodiment of the present invention.
Figure 7B:
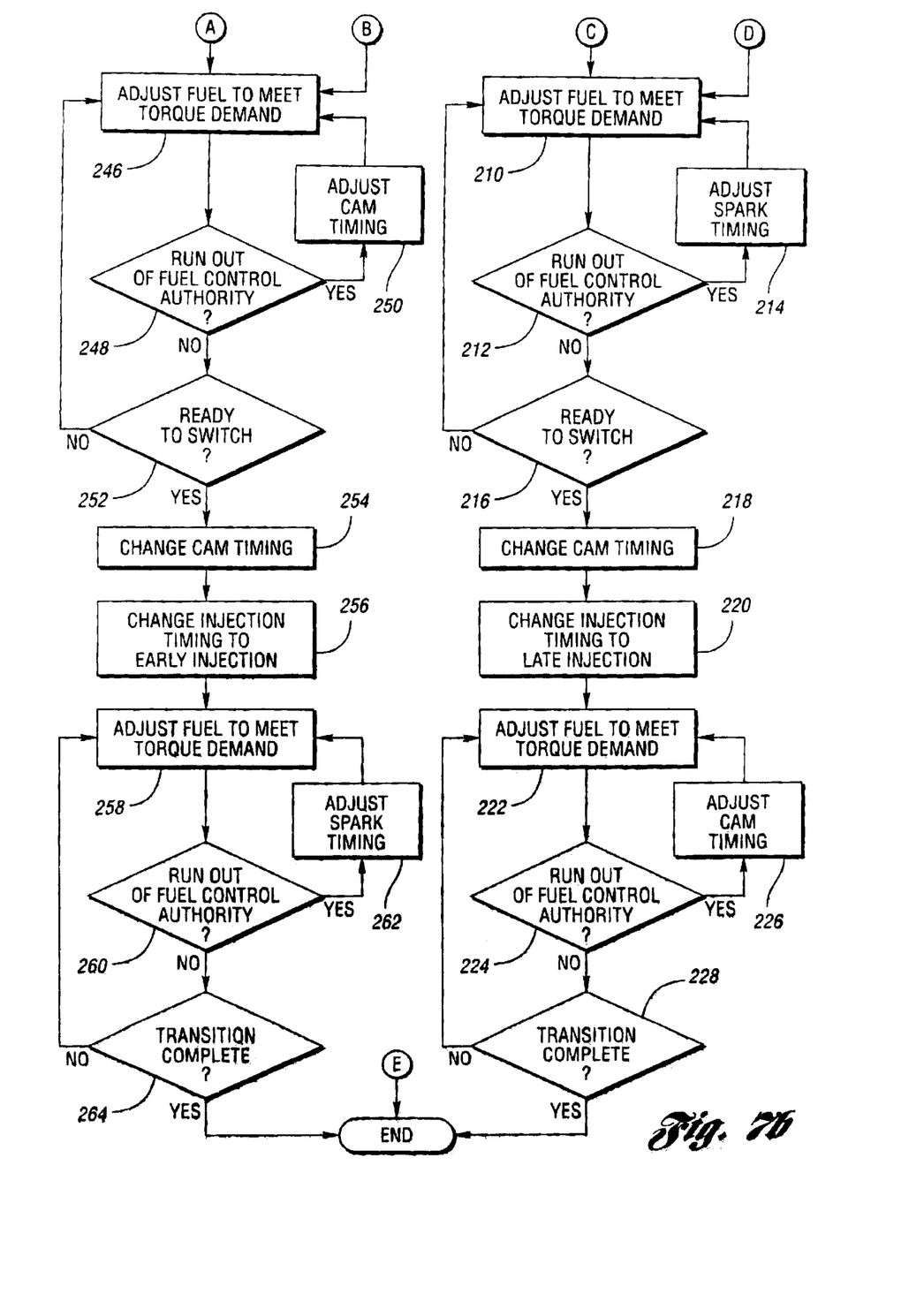

FIG. 7 is a flowchart illustrating operation of one embodiment for a system or method of mode transition according to the present invention. The diagram of FIG. 7 represents control logic of one embodiment of a system or method according to the present invention. As will be appreciated by one of ordinary skill in the art, the diagram of FIG. 6 may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustrating and description. The present invention is independent of the particular software, hardware, and programming language or strategy which may vary by application. Although not explicitly illustrated, one of ordinary skill in the art will recognize that one or more of the illustrated steps or functions may be repeatedly performed depending upon the particular processing strategies being used.

Preferably, the control logic illustrated in FIG. 7 is implemented in software which is executed by a microprocessor-based engine controller, such as illustrated and described with reference to FIG. 1. Of course, the control logic may be implemented in software, hardware, or a combination of software and hardware depending upon the particular application. When implemented in software, the control logic is preferably provided in a computer-readable storage medium having stored data representing instructions executed by a computer to control the engine and/or vehicle. The computer-readable storage medium or media may be any of a number of known physical devices which utilize electric, magnetic, and/or optical devices to temporarily or persistently store executable instructions and associated calibration information, operating variables, and the like.

In the embodiment illustrated in FIG. 7, block 200 determines whether a mode transition is necessary by comparing the current operating mode to the desired operating mode. If the current and desired operating modes are different, block 202 determines whether the desired mode is a stratified operating mode. As such, blocks 204–228 represent control during transitions from a homogeneous operating mode to a stratified operating mode, while blocks 240–264 represent control during transitions from a stratified operating mode to a homogeneous operating mode.

During a transition from homogeneous mode to stratified mode, block 204 represents pre-positioning of the electronically controlled throttle to a position corresponding to the stratified operating mode. Block 206 determines whether valve timing pre-positioning is desired or required. Valve timing may be modified in conjunction with pre-positioning of the throttle valve to further reduce the transition time. Valve timing may be controlled depending upon the particular application by modifying a variable cam timing device, variable valve timing actuators, and the like. Thus, intermediate valve timing or pre-positioning may be used in conjunction with control of the electronic throttle depending upon the current operating conditions and/or application. Block 210 adjusts the fuel flow to substantially maintain the desired or required engine torque as the air/fuel ratio approaches the air/fuel ratio gap between homogeneous and stratified modes. If fuel flow control is insufficient to achieve the desired torque as determined by block 212, block 214 may adjust ignition timing. Block 216 determines whether the operating conditions are favorable to switch between the operating mode and traverse the air/fuel ratio gap.

Blocks 204–216 of FIG. 7 represent control during the pre-positioning phase or period of the mode transition between homogeneous and stratified operating modes. In operation, when the throttle is moved by block 204, manifold pressure and cylinder air charge are gradually increased because of the intake manifold dynamics. Fuel is adjusted as represented by block 210 to maintain the desired or required engine torque while spark is controlled to its optimal value, i.e. substantially unaffected by the transition. Depending on the particular application or operating conditions, valve timing (cam position for VCT applications or actuator timing for VVT applications) can be held at its starting point, or moved to an intermediate point as represented by block 208 which facilitates the additional step at the beginning of the switching phase represented by blocks 218 and 220.

During the switching phase, block 218 modifies the valve timing to a valve timing associated with the stratified operating mode while block 220 changes the fuel injection timing from early to late injection. Preferably, block 218 provides a step change in valve timing to effect a corresponding change in cylinder air charge. The magnitude of the step in the air charge is determined so that the constraint on air/fuel ratio can be satisfied without a step in the fuel flow.

Blocks 222–228 of FIG. 7 represent control during the settling phase of a transition from homogeneous to stratified operating mode. Blocks 222–228 coordinate control of fuel and spark until the transition has been completed. Coordination of fuel flow, valve timing, and throttle position according to the present invention is used to provide smooth trajectories for the intake manifold pressure and cylinder air charge. Because the air charge responds to a step in valve timing as a typical second-order system with an overshoot (as illustrated in FIGS. 4 and 5), valve timing and throttle position should be coordinated to provide a smooth response of cylinder air charge and intake manifold pressure. Appropriate controllers meeting application-specific requirements can be designed by any of a number of known techniques.

Blocks 240–264 of FIG. 7 represent control during transitions from stratified to homogeneous operating modes. Blocks 240–252 represent the pre-positioning phase, blocks 254–256 represent the switching phase, and blocks 258–264 represent the settling phase. Transition control from stratified to homogeneous mode proceeds in a similar fashion to that described for transitions from the homogeneous mode to the stratified mode. Differences between the mode transitions are illustrated with respect to blocks 240, 250, and 262 relative to blocks 204, 214, and 226, respectively. During transitions from stratified mode to homogeneous mode, the throttle position is controlled to reduce or close the throttle as indicated by block 240. The converse is generally true for transitions from homogeneous to stratified mode. In addition, block 250 may adjust valve timing to achieve the desired or required torque demand if fuel control authority is insufficient as represented by block 248, in contrast to using spark timing during this phase as is used for the opposite transition. The spark timing is adjusted as represented by block 262 during the settling phase if fuel flow control is insufficient to achieve the desired or required torque as represented by blocks 258 and 260, whereas valve timing is used for this purpose during transitions in the opposite direction.

As such, by using valve timing in coordination with an electronic throttle to modulate the intake air during transitions between homogeneous and stratified operating modes, the present invention substantially reduces or eliminates any discontinuous step in fuel flow and associated spark retard which would otherwise be necessary for torque management. The combination of valve timing control and electronic throttle control may also result in reduced transition times and improve purging cycle efficiency.

While the best mode for carrying out the invention has been described in detail, those familiar with the art to which this invention relates will recognize various alternative designs and embodiments for practicing the invention as defined by the following claims.

What is claimed is:

1. A method for controlling a direct injection stratified charge engine having an electronically controlled throttle and controllable valve timing during transitions between a current operating mode and a desired operating mode corresponding to stratified and homogeneous operating modes to reduce variations in engine torque from a desired engine torque, the method comprising:

moving the throttle to a position associated with the desired operating mode;

adjusting fuel flow to substantially maintain the desired engine torque as air/fuel ratio approaches an air/fuel ratio gap between acceptable air/fuel ratios for the current operating mode and acceptable air/fuel ratios for the desired operating mode; and changing valve timing to valve timing associated with the desired operating mode to modify cylinder air charge while changing fuel injection timing associated with the current operating mode to fuel injection timing associated with the desired operating mode as the air/fuel ratio traverses the gap.

2. The method of claim 1 wherein the step of changing valve timing comprises modifying cam timing to obtain a desired air/fuel ratio without a step change in fuel flow.

3. The method of claim 1 further comprising:

changing valve timing to an intermediate timing prior to adjusting fuel flow, the intermediate timing being between valve timing associated with the current operating mode and valve timing associated with the desired operating mode.

4. The method of claim 1 wherein the transition is from the homogeneous mode to the stratified mode and wherein the step of adjusting fuel flow includes modifying valve timing or spark timing if adjusting fuel flow is insufficient to maintain the desired engine torque.

5. The method of claim 1 further comprising:

modifying steady state throttle position and valve timing associated with the current engine operating mode to reduce time required for transition between the current engine operating mode and the desired engine operating mode.

6. The method of claim 1 wherein the transition is from the stratified mode to the homogeneous mode and wherein the step of adjusting fuel flow includes modifying spark timing or valve timing if adjusting fuel flow is insufficient to maintain the desired engine torque.

7. The method of claim 1 further comprising:

modifying steady state throttle position and valve timing associated with the current engine operating mode to reduce time required to transition between the current engine operating mode and the desired engine operating mode.

8. The method of claim 1 further comprising:

adjusting fuel flow to maintain the desired engine torque after changing fuel injection timing.

9. The method of claim 8 wherein the transition is from the stratified mode to the homogeneous mode and wherein the step of adjusting fuel flow after changing fuel injection timing includes modifying spark timing if adjusting fuel flow is insufficient to maintain the desired engine torque.

10. The method of claim 8 wherein the transition is from the homogeneous mode to the stratified mode and wherein the step of adjusting fuel flow after changing fuel injection timing includes modifying valve timing if adjusting fuel flow is insufficient to maintain the desired engine torque.

11. A computer readable storage medium having stored data representing instructions executable by a computer to control a direct injection stratified charge engine having an electronically controlled throttle and controllable valve timing during transitions between a current operating mode and a desired operating mode corresponding to stratified and homogeneous operating modes to reduce variations in engine torque from a desired engine torque, the computer readable storage medium comprising:

instructions for moving the throttle to a position associated with the desired operating mode;

instructions for adjusting fuel flow to substantially maintain the desired engine torque as air/fuel ratio approaches an air/fuel ratio gap between acceptable air/fuel ratios for the current operating mode and acceptable air/fuel ratios for the desired operating mode; and instructions for changing valve timing to valve timing associated with the desired operating mode to modify cylinder air charge while changing fuel injection timing associated with the current operating mode to fuel injection timing associated with the desired operating mode as the air/fuel ratio traverses the gap.

12. The computer readable storage medium of claim 11 further comprising instructions for changing valve timing to an intermediate timing prior to adjusting fuel flow, the intermediate timing being between valve timing associated with the current operating mode and valve timing associated with the desired operating mode.

13. The computer readable storage medium of claim 11 wherein the instructions for adjusting fuel flow include instructions for modifying valve timing if adjusting fuel flow is insufficient to maintain the desired engine torque.

14. The computer readable storage medium of claim 11 wherein the instructions for adjusting fuel flow include instructions for modifying spark timing if adjusting fuel flow is insufficient to maintain the desired engine torque.

15. The computer readable storage medium of claim 11 further comprising:

instructions for modifying steady state throttle position and valve timing associated with the current engine operating mode to reduce time required to transition between the current engine operating mode and the desired engine operating mode.

16. A system for controlling a direct injection stratified charge engine during transitions between a current operating mode and a desired operating mode with associated ranges of acceptable air/fuel ratios having a gap between acceptable air/fuel ratios associated with the current and desired operating modes, the system comprising:

an electronically controlled throttle valve assembly disposed within an intake air flow passage;

at least one valve timing actuator for controlling intake and/or exhaust valve timing;

a plurality of fuel injectors; and a controller in communication with the electronically controlled throttle valve assembly, the plurality of fuel injectors, and the at least one valve timing actuator for moving a throttle valve to a position associated with the desired operating mode, controlling the fuel injectors to adjust fuel flow to substantially maintain a desired engine torque as current air/fuel ratio approaches the gap between acceptable air/fuel ratios for the current operating mode and acceptable air/fuel ratios for the desired operating mode, and controlling the at least one valve timing actuator to change valve timing to valve timing associated with the desired operating mode while changing fuel injection timing associated with the current operating mode to fuel injection timing associated with the desired operating mode as the air/fuel ratio traverses the gap.

17. The system of claim 16 wherein the controller controls the at least one valve actuator to change valve timing to an intermediate timing prior to adjusting fuel flow, the intermediate timing being between valve timing associated with the current operating mode and valve timing associated with the desired operating mode.

18. The system of claim 16 wherein the controller controls the at least one valve timing actuator to modify valve timing if adjusting fuel flow is insufficient to maintain the desired engine torque.

19. The system of claim 16 further comprising an ignition system in communication with the controller, wherein the controller adjusts ignition timing if adjusting fuel flow is insufficient to maintain the desired engine torque.

20. The system of claim 16 wherein the controller modifies steady state position of the throttle valve and setting of the at least one valve timing actuator associated with the current engine operating mode to reduce time required to transition between the current engine operating mode and the desired engine operating mode.

* * * * *